United States Patent [19]

Dunken et al.

[11] Patent Number: 5,232,120

[45] Date of Patent: Aug. 3, 1993

[54] CONTAINER FOR BULK LIQUIDS AND SOLIDS

[75] Inventors: Sidney H. Dunken, Jonesboro; Joseph J. Lane, Statesboro; Jack E. Harris, Smyrna, all of Ga.

[73] Assignee: 21st Century Containers, Ltd., Atlanta, Ga.

[21] Appl. No.: 710,027

[22] Filed: Jun. 4, 1991

[51] Int. Cl.$^5$ ............................................. B65D 90/00
[52] U.S. Cl. ................................... 220/661; 220/676; 220/306; 220/630; 220/645; 206/508; 206/509
[58] Field of Search ................ 220/1.5, 630, 601, 605, 220/631, 637, 628, 645, 661, 676, 306; 206/508, 509, 511

[56] References Cited

U.S. PATENT DOCUMENTS

| | | | |
|---|---|---|---|
| 2,354,425 | 7/1944 | Kuhn | 220/661 |
| 2,887,251 | 5/1959 | Mackridge | 222/131 |
| 3,274,671 | 9/1966 | Haver et al. | 220/661 |
| 3,827,595 | 8/1974 | Reynolds | 220/661 |
| 4,157,609 | 6/1979 | Schütz | 29/428 |
| 4,173,288 | 11/1979 | Schütz | 220/1.5 |
| 4,426,015 | 1/1984 | Preston | 220/403 |
| 4,516,692 | 5/1985 | Croley | 222/105 |
| 4,557,406 | 12/1985 | Olinger et al. | 222/564 |
| 4,609,120 | 9/1986 | Lauer et al. | 220/69 |
| 4,648,521 | 3/1987 | Thomas et al. | 220/1.5 |
| 4,666,059 | 5/1987 | Nordstrom | 220/465 |
| 4,746,034 | 5/1988 | Ata et al. | 222/143 |
| 4,782,973 | 11/1988 | Wiese | 220/68 |
| 4,793,519 | 12/1988 | Voorhies, Jr. | 220/465 |
| 4,840,284 | 6/1989 | Snyder | 220/5 A |
| 4,909,387 | 3/1990 | Schütz | 206/386 |
| 4,930,648 | 6/1990 | Hundt | 220/676 |

OTHER PUBLICATIONS

Chemical Handling Equipment Co., Inc., Tuff Tank (on or about) Mar. 1989.
Hoover Group Inc., Bulk Drum II (on or about) Mar. 1989.
Geer et al., "PDCPD: A New Structural Resin Poised for the '80s," *Plastics Engineering* (Nov. 1985) at 41.
Ettore, "The Metton TM System-A Breakthrough in Structural Plastics," presented at the AIChE Meeting, New Polymer Technology for Auto Body Exteriors, Nov. 27, 1987, *AIChE Seminar Series* (No. 260, vol. 84)(1987) at 87.
Sonoco Products Co., DAK-PAK, *Hazmat World* (Mar. 1991) at 95.
Consolidated Plastics, Delcon ® Closed Head Drums and Open Head Drums (on or about) Mar. 1991.
Georgia Polymer, Inc., Saturn 350 TM, (on or about) Aug. 1990.
Georgia Polymer, Inc., Atlas 360 TM, (on or about) Aug. 1990.
ENPAC Corporation, POLY-OVERPACK ® *Hazmat World* (Mar. 1991) at 80.

Primary Examiner—Joseph Man-Fu Moy
Attorney, Agent, or Firm—Fitzpatrick, Cella, Harper & Scinto

[57] ABSTRACT

A bulk shipping and storage container for liquids or dry powders comprising a rigid, round, plastic vessel, molded in one piece, and a lid for the vessel. Preferably, these parts are molded of poly(dicyclopentadiene), using the reaction injection molding (RIM) process. The lateral wall of the vessel is inclined inwardly from top to bottom so as to define an upper truncated conical section and lower truncated conical section coaxial with the upper section. The lateral wall is equipped with means for securing the lid to the top of the vessel. A recess is formed in the lateral wall of the vessel and this recess can be tapped with a threaded drainage hole to receive a threaded drain valve. The vessel's bottom is sloped towards this recess to permit complete draining of the container's contents. The container may be mounted on a pallet member or seated in a tub. Alternatively, it may be molded with an integral pallet formed by the lower portion of its lateral wall. Preferably, inelastic restraining straps or fastening wires are used to secure the container to the wooden pallet member. Preferably, one or more ring-shaped expansion chambers are formed in the vessel's lid. It is further preferred that when a container with an integral pallet or a container seated in a tub is stacked upon a similar container, the underside of the upper container's pallet will nest in the lower container's lid.

81 Claims, 8 Drawing Sheets

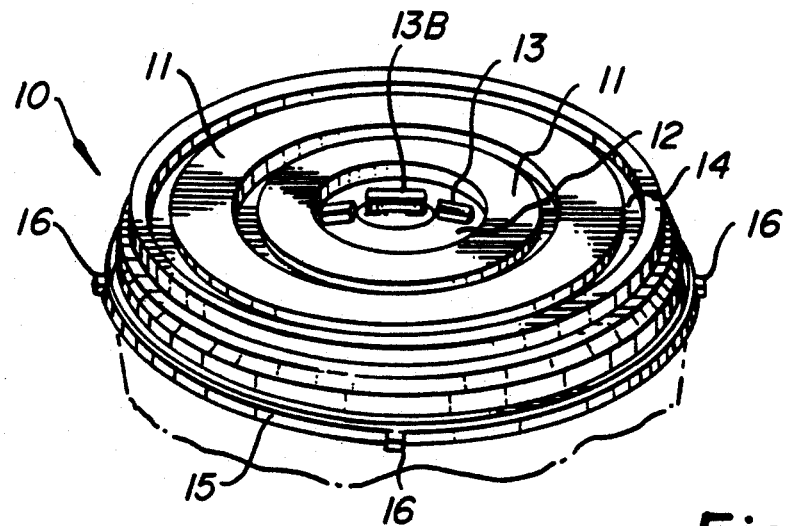
Fig. 2
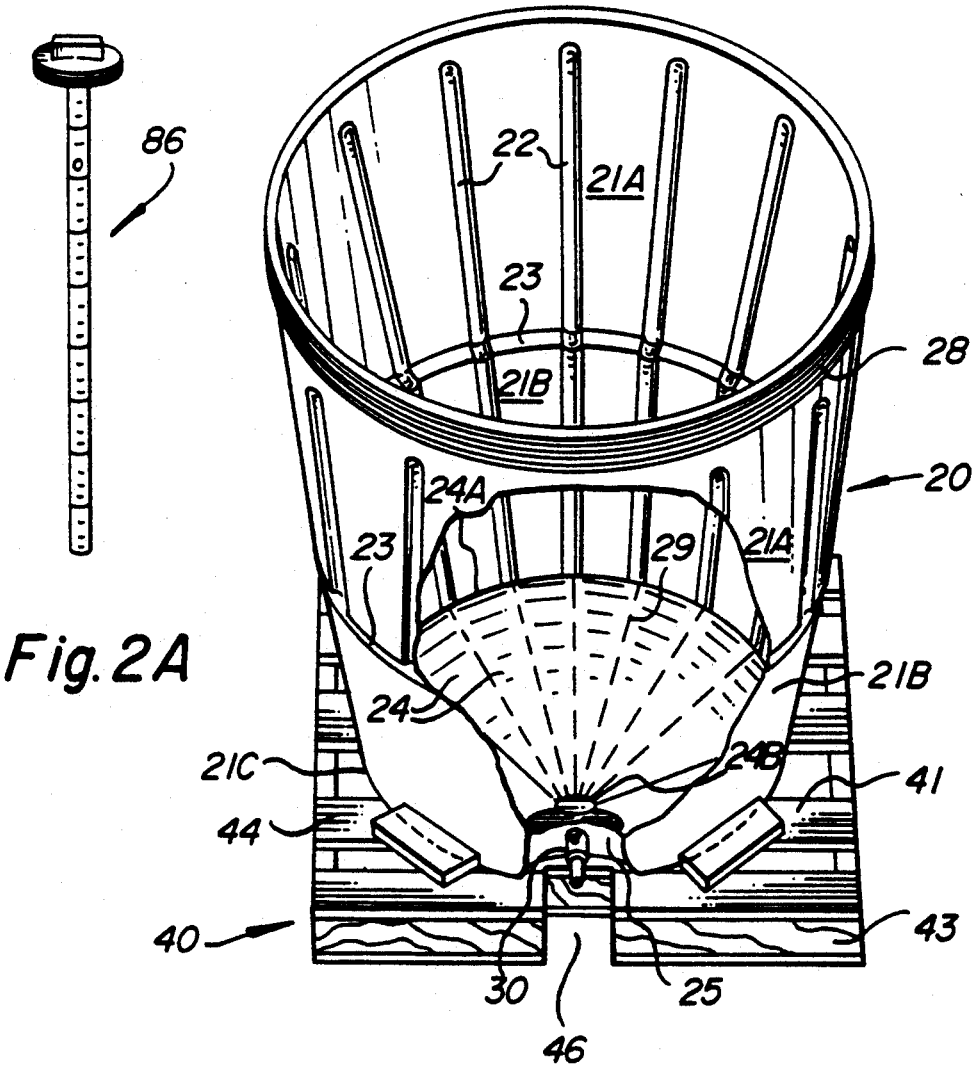
Fig. 2A
Fig. 3

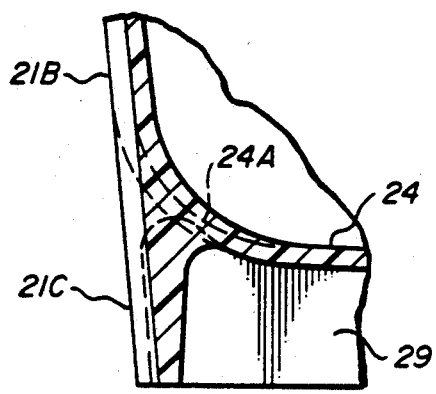
Fig. 7
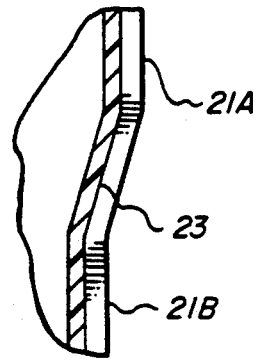
Fig. 6
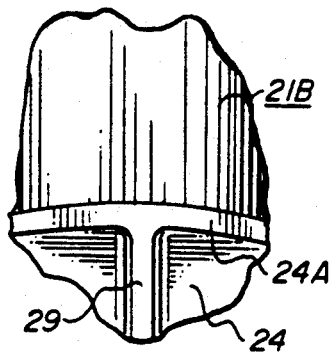
Fig. 9
Fig. 8
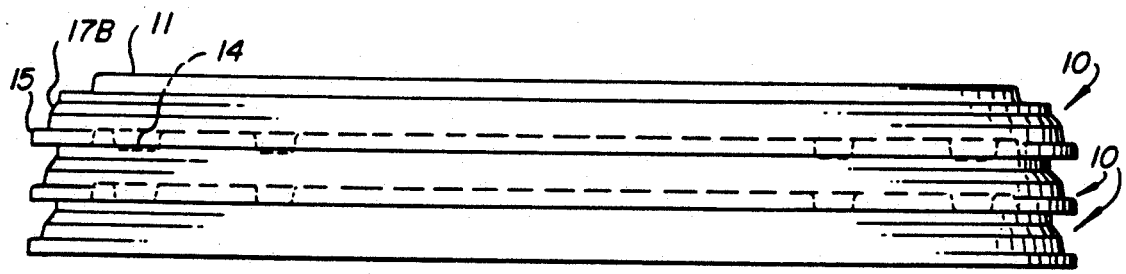
Fig. 10

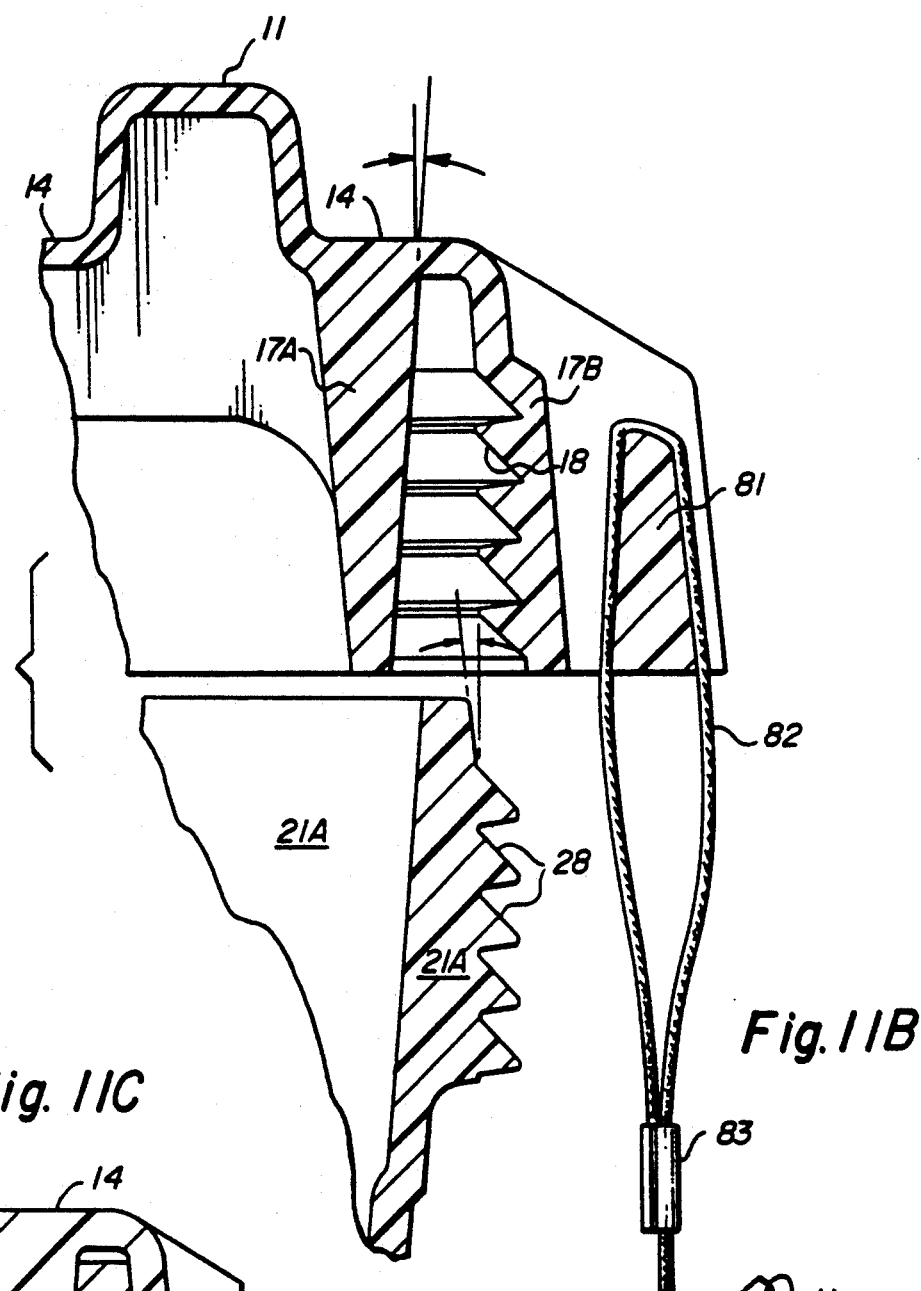
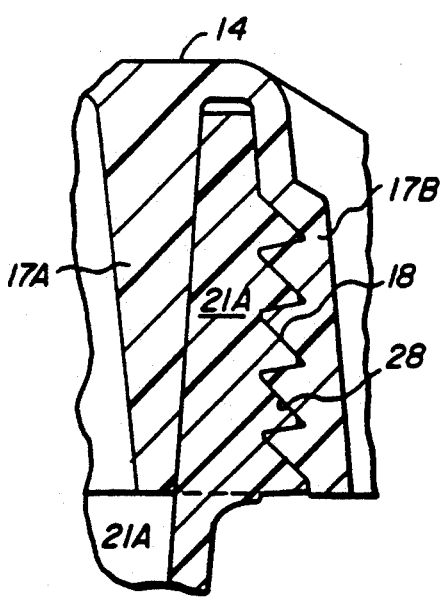
Fig. 11C
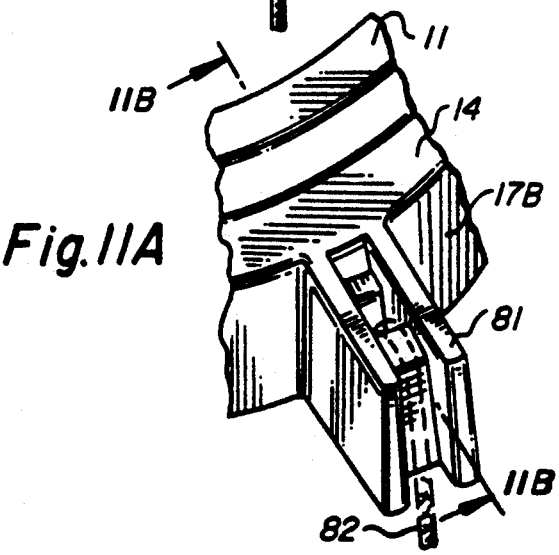
Fig. 11A

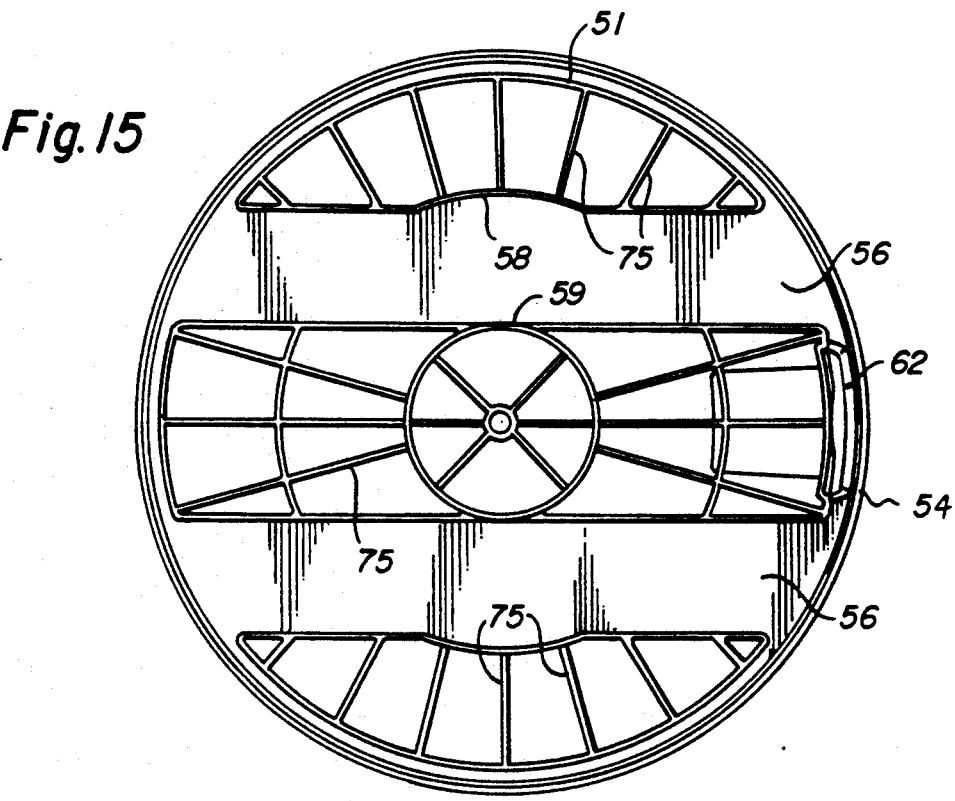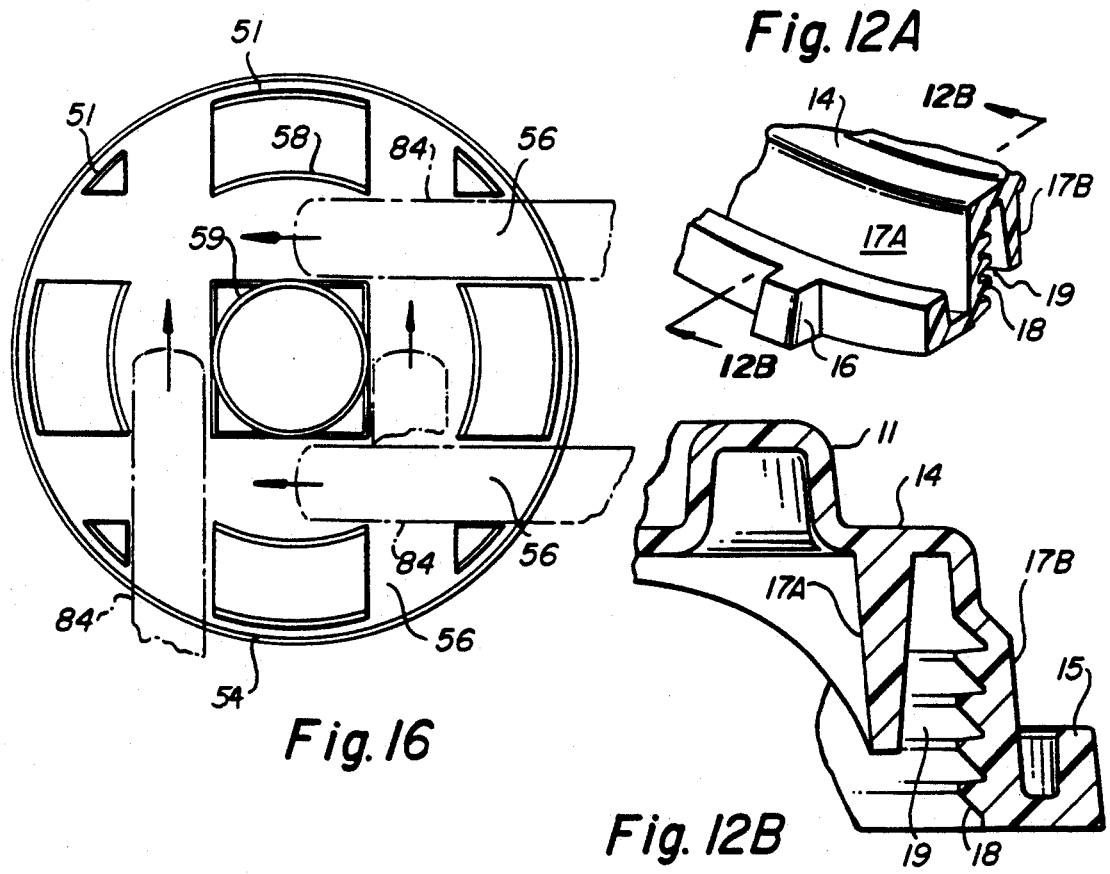

CONTAINER FOR BULK LIQUIDS AND SOLIDS

BACKGROUND OF THE INVENTION

1. Field of Invention

This invention relates to bulk containers for the shipping and storage of liquids and dry powders. In particular, it relates to such containers as have dispensing valves and are reusable.

2. Description of Related Art

Many liquids and dry powders used in large quantities in manufacturing operations are transported in what are called bulk containers. Barrels and drums are examples of these. Often it is desirable to be able to quickly and easily draw off just a portion of the container's contents. For this purpose, the container can be equipped with a dispensing device, e.g., a gravity flow valve near the bottom of the container.

Bulk containers larger than the traditional fifty (50) or fifty-five (55) gallon metal drums have grown in popularity in recent years. Thus, for example, blow-molded plastic bottles ranging in size from about thirty (30) to one thousand (1,000) gallons are now in widespread use. Generally, these bottles are held inside wooden or metal crates or boxes, or inside multi-walled, corrugated paper boxes, to allow them to be stacked one atop the other, even when full, and to protect them against puncture. After these bottles are empty, however, it is very difficult to clean them out so that they can be reused. Usually, these bottles are scrapped after one use. Corrugated paper outer boxes are invariably weakened during use and have to be scrapped after one use as well.

The cost of disposing of such containers is significant. Environmental regulations prohibit burying them intact in landfills. They must be broken down first, which is a costly, labor-intensive operation. The plastic bottles must be ground up before they can be recycled. The metal housings, or outer boxes, for the plastic bottles can be re-used, but they are often bulky and inefficient to transport when empty.

Although steel drums may provide easier access for cleaning for re-use, their weight and tendency to corrode are detractors. Today, most drums are designed to be used once, then discarded. A current reported estimate of the cost of handling and disposing of a fifty-five (55) gallon drum is forty (40) to fifty (50) dollars (U.S.). Also, drums generally cannot be shipped with a dispenser valve in place; it prevents stacking So the valve has to be installed in the drum's bunghole by the customer. Then, if the valve is a gravity flow valve, the drum must be turned on its side and secured with blocks or laid in a cradle to keep it from rolling.

Another common problem with bulk containers is a tendency not to drain completely, leaving as much as seven (7) to eight (8) percent of their contents in the bottom.

A drawback with blow-molded bottles is their tendency to leak at the connection between the bottle and the dispenser valve's neck. The neck typically is sonically welded to the bottle. When the bottle is full, the connection is under substantial stress. A minor bumping of the dispenser valve can rupture the weld.

There is a need, therefore, for a transportable bulk container that is lighter than a comparable size steel drum, is corrosion resistant, drains completely, is stackable even when full, can easily be cleaned out, is reusable, can be efficiently transported when empty, and can be fitted with a gravity flow dispenser valve that will resist damage during transportation o the filled container. The container of the present invention satisfies these needs.

SUMMARY OF THE INVENTION

The container of the present invention is comprised of a rigid, round, plastic vessel, molded in one piece, and a lid for the vessel The vessel has a bottom, a lateral wall, and an open top. The lateral wall is equipped with means for securing the lid to the top of the vessel and, thereby, sealing the vessel. The wall is inclined inwardly from top to bottom so as to define an upper truncated conical section and a lower truncated conical section coaxial with the upper section. The lower conical section is set back, so as to create a horizontal shoulder around the circumference of the inside of the vessel. Both of the conical sections are sections of right circular cones. There is a recess in the wall, adjacent the bottom. The inside surface of the bottom of the vessel is sloped downward toward the recess. This downward slope is preferably between about two (2) and six (6) degrees. At the location of the recess, the wall is at least about five (5) times thicker than elsewhere. The wall is strengthened by a plurality of vertical ribs.

The lid is equipped with means for securing the lid to vessel's wall. The lid has a threaded fill opening, preferably centrally located, and a threaded cap that mates with the threads in the fill opening. Preferably, the cap for the fill opening will have at least one bunghole in it and a bung to plug each hole. The bunghole preferably is formed with female threads, to receive a male-threaded bungplug.

Preferably, the lid for the vessel will have at least one expansion chamber that will trap a pocket of air when the container is filled with a liquid to the top of the fill opening. The expansion chamber advantageously may be in the shape of an upwardly bulging ring that is concentric with the lid's circumference. It is also preferred that the lid be formed with a plurality of reinforcing ribs extending radially from the lid's central fill opening, e.g., on the underside of the lid.

By making the wall of the vessel at the bottom recess at least about five (5) times thicker than elsewhere, the wall can be drilled and tapped at that point so as to create a horizontal discharge hole that is suitable for receiving a male-threaded dispensing device This provides a more leak-resistant dispenser valve than can be achieved with the blow-molded bottles. Preferably, the lowest point of the discharge hole will be at substantially the same level as the lowest point inside the vessel.

The means for securing the lid to the top of the vessel may be circumferential threads on the lid that mate with circumferential threads on the top of the lateral wall of the vessel. The lid's circumferential threads preferably will be in a narrow annulus defined by two parallel, circumferential wall sections projecting downward from the underside of the lid. The width of the annulus preferably is approximately the same as the width of the vessel's lateral wall at its top. This construction protects the lid from being jarred loose if the vessel is dropped or receives a blow.

The angle of inclination of the vessel wall is preferably within the range of about two (2) to ten (10) degrees. The ratio of the height of the vessel to the diameter of the vessel at its bottom is preferably within the range of about 1:1 to 1.5:1.

The vertical ribs in the vessel's wall preferably are convex on the inner surface of the wall and either concave or flush on the outer surface of the wall, or both, in different areas, e.g., the vertical ribs may be concave on the upper section of the outer surface of the vessel's wall and flush on the lower section, so as to fit snugly in a reinforcing tub (to be described later herein).

In use, the container may be mounted on a separate pallet. If it is to be so mounted, preferably the underside of the bottom of the vessel will have a plurality of downwardly projecting, triangular reinforcing fins that extend radially from the recess in the wall and are substantially flush on their bottom edges with the bottom of the vessel's lateral wall. Preferably, the container will be secured to the separate pallet by at least two inelastic securing straps. The straps ideally will cross twice, once over the fill opening and once beneath the pallet. The straps preferably are bound together at these crossing points by retaining bands. Preferably, the pallet is designed to receive a forklift's tines. In that case, the straps should be positioned so as not to interfere with the entry ports, or pockets, for the tines.

The lid of the container can also be formed with a plurality of fastening lugs positioned about its circumference. The container may then be secured to a pallet by running fastening wires between these lugs and tie-down points located on the pallet.

Alternatively, the vessel's bottom can be structured so as to serve as its own pallet. If the container is to have such an integral pallet, then the lower section of the vessel's lateral wall will extend further below the vessel's bottom, and this lower section will include forklift pockets, preferably permitting at least two-way entry. Preferably, the pockets will be on either side of the dispenser device, so as to permit easy access to a row of the containers aligned side by side with their dispensers toward the front. If desired, the forklift pockets can permit four-way entry, i.e., from either side, from the rear, or from the front.

To add greater strength to the container, rather than mount it on a flat pallet or mold it with an integral pallet, it can be fitted with a rigid, round, plastic tub of a shape and size that permit the vessel to sit snugly inside the tub. The tub, which is also molded in one piece, has a bottom, a lateral wall, and an open top. To permit the tub to strengthen the container and to serve as a pallet, the tub's lateral wall should extend below the tub's bottom and should include forklift pockets permitting at least two-way entry. The height of the tub's wall above its bottom should be about thirty-three (33) to fifty (50) percent of the height of the vessel's lateral wall. Preferably, the top of the tub's lateral wall will correspond to the horizontal shoulder formed by the junction of the upper and lower truncated conical sections. If desired, the tub's forklift pockets may be configured to permit four-way entry.

If desired, the tub may be equipped with a strengthening lip that extends horizontally from the tub's wall at the level of the tub's bottom. The strengthening lip should also extend vertically and its bottom should be flush with the bottom edge of the tub's wall. When containers are stacked, the strengthening lip of an upper container contacts the lid of a lower container immediately above the lower container's vessel wall. This placement helps place the weight of an upper container on the vessel wall of a lower container, thus preventing the lid(s) of the lower container(s) from sagging.

It is contemplated that the vessel of the present invention can have a capacity anywhere from about thirty (30) to one thousand (1,000) gallons. Most commonly, however, it will be in the range of about fifty-five (55) to five hundred (500) gallons.

The plastic used to make the vessel, the lid, and the tub (if used) preferably will have a flexural modulus in the range of about 250,000 to 1,500,000 p.s.i. (ASTM Method D 790), a tensile modulus in the range of about 200,000 to 1,000,000 p.s.i. (ASTM Method D 638), a Rockwell hardness in the range of R-100 to R-130 (ASTM Method D 785), and an Izod impact strength (notched, at 23° C.) in the range of about 6 to 17 ft. lbs./inch (ASTM Method D 256).

The vessel is preferably formed by reaction injection molding (RIM). In the typical RIM process, two reactant streams are combined in a mixhead, and this mixture is then injected into a mold in which polymerization occurs. The RIM process can be used with polyurethane resins, polyurea resins, and poly(dicyclopentadiene) resins.

When a polyurethane resin is to be prepared, a polyisocyanate (e.g., a diisocyanate) will be supplied in one reactant stream and a polyol will be supplied in the other. When poly(dicyclopentadiene) is prepared, one reactant stream contains both the activator and a moderator of a metathesis catalyst system, and the other reactant stream contains the catalyst. The dicyclopentadiene monomer can be present in either stream, or in both. Further details for this process can be found in U.S. Pat. Nos. 4,400,340; 4,436,858; 4,469,809; 4,481,344; 4,485,208; 4,507,453; 4,520,181; 4,598,102; 4,607,077; 4,657,981; 4,661,575; 4,703,098; 4,708,869; 4,710,408; 4,727,125; and 4,740,537.

Poly(dicyclopentadiene) is the preferred resin, especially for vessels having a capacity greater than thirty (30) gallons. Polyurethane and polyurea resins are probably not strong enough to be suitable for vessels having capacities greater than about two hundred (200) gallons.

The thickness of the vessel wall and bottom will depend on the particular plastic from which it is molded and the size of the vessel. Generally, however, the vessel wall at the recess will have a thickness within the range of about one (1) to two (2) inches, and the thickness of the wall elsewhere will be within the range of about 0.145 to 0.280 inch.

The lid and tub (if used) are preferably RIM-molded as well. It is also desirable that the lid have an upturned lip around its outer edge, especially when it is molded with female threads. The plastic tends to shrink into these threads during the molding process, making it difficult to separate the lid and the mold. By having an outer lip on the lid, this shrinkage is reduced. Preferably, the lid will have a plurality of turning lugs on its circumference. The presence of the lip and the turning lugs facilitates the process of separating the mold and the lid during manufacturing. The outer mold can be removed and by engaging the lugs, the portion of the mold imparting the threads to the lid can be unscrewed from the lid.

When the container has an integral pallet in the bottom of the vessel, it is preferred that the lid have an upwardly bulging ring, e.g., the expansion chamber, that is concentric with the lid's circumference, in order to facilitate stacking, and that the outside bottom surface of the vessel be configured to receive the expansion chamber. When one such container is stacked upon another, the ring in the lid of the lower container should be so sized and located that it nests in a recess in the bottom of the upper container, stabilizing the latter against lateral movement with reference to the lower container.

THE DRAWINGS

The accompanying drawings depict preferred embodiments of the container of the present invention Referring to the drawings:

FIG. 2 is a reduced-size, overhead, perspective view of the lid;

FIG. 2A is a reduced size perspective of a combined dip stick and drain vent which is formed as part of the bungplug of FIG. 2;

FIG. 3 is a reduced-size, overhead perspective view of the vessel portion of the container and the wooden pallet as depicted in FIG. 1;

FIG. 6 is an enlarged detail view, in cross-section, of the portion of the lateral wall of the container depicted in FIG. 1 containing the horizontal shoulder;

FIG. 7 is an enlarged detail view, in cross-section, of the lateral wall of the container depicted in FIG. 1 where the bottom and the wall meet:

FIG. 8 is an enlarged detail view of a cross-section of the bottom wall of the vessel depicted in FIG. 4, taken along line 8—8, where the triangular reinforcing fin joins the bottom wall;

FIG. 9 is an enlarged detail view of the portion of the vessel depicted in FIG. 4 at which a vertical rib meets a triangular reinforcing fin at the convergence of the vessel's lateral wall and bottom;

FIG. 10 is a semi-schematic representation of three of the lids depicted in FIG. 2, stacked one on top of the other;

FIG. 11A is a perspective view of the upper right corner of the vessel depicted in FIG. 1 and the complementary section of a lid to go therewith, equipped with a tie-down feature;

FIG. 11B is an enlarged detail view, in cross-section, of the lid in FIG. 11A, taken along the line 11B—11B, equipped with the tie down feature;

FIG. 11C is a enlarged detail view, in cross-section, of the vessel and lid in FIG. 11B, but with the lid screwed down onto the top of the vessel;

FIG. 12A is a perspective view of a portion of the lid in FIG. 2, equipped with the surrounding lip and a lug;

FIG. 12B is an enlarged detail view, in cross-section, of the lid depicted in FIG. 12A, taken along line 12B—12B;

FIG. 15 is a bottom view of the tub depicted in FIG. 13;

FIG. 16 is a reduced-size bottom view of an alternative configuration for the tray pallet shown in FIG. 15, designed to permit four-directional access by a forklift's tines:

DETAILED DESCRIPTION OF THE INVENTION AND PREFERRED EMBODIMENTS OF IT

Figure 1:
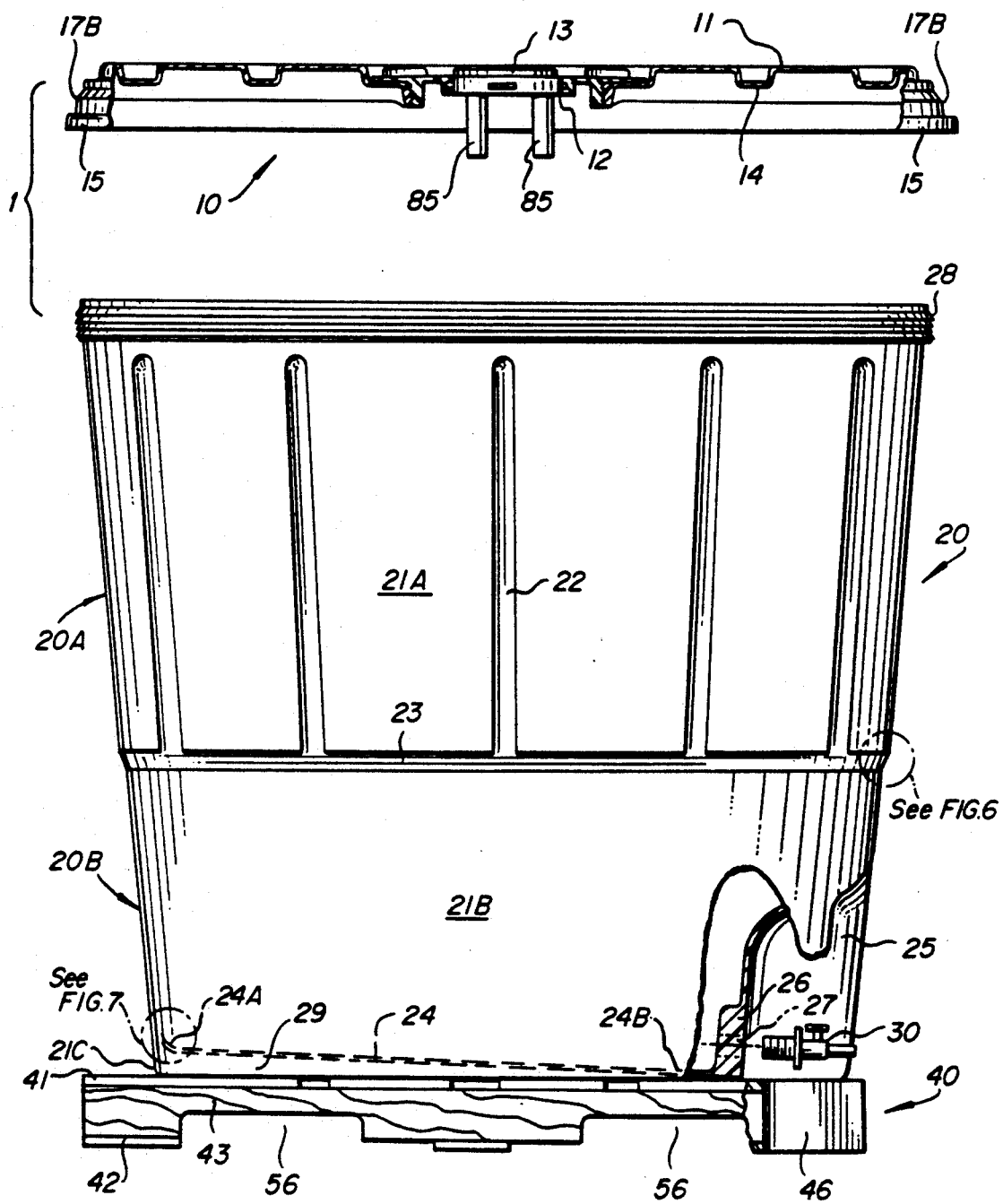
FIG. 1 is an elevation view (partially broken-away and partly disassembled) of a 360-gallon container of the present invention, resting on a wooden pallet.

Referring to FIG. 1 of the drawings, a transportable, self-supporting container with a three hundred and sixty (360) gallon capacity, indicated generally as 1, is formed of a vessel 20 and a lid 10. Vessel 20 has a lateral wall 21A-C and a bottom 24. Bottom 24 has a downward slope of two (2) degrees. Its height is fifty-two and one-half (52.5) inches, and its diameter at its base is forty-four (44) inches. Lid 10 has a diameter of fifty-four (54) inches and is fitted with a twelve (12) inch diameter, threaded fill opening 12 and is mounted on a pallet member 40 with a top surface 41 and a bottom surface 42 and depending, spaced apart support members 43. Container 1 is capable of being stacked filled. Although the pallet member 40 depicted is wooden, it may be constructed either of plastic or of metal as well. Vessel 20 and lid 10 are formed by the RIM process, using poly(dicyclopentadiene) and are secured to pallet member 40 by two or more inelastic securing straps (not shown). Each strap passes over the center of fill opening 13 and under the center of pallet member bottom surface 42. The ends of each strap (not shown) are joined together, and the straps are held together by retaining bands (not shown) at their crossing points.

As shown in FIGS. 1 and 2, lid 10 is round and has a centrally located, threaded fill opening 12. Fill opening 12 is fitted with a fill opening cap 13. As shown in FIG. 2, fill opening cap 13 may be equipped With two or more drain vents 85 which permit container 1 to be drained without loosening or removing cap 13. Cap 13 may also be formed with at least one two (2) inch diameter, female-threaded bunghole 13A which Can receive a two (2) inch diameter, male-threaded bungplug 13B, depicted in FIG. 2. Although wall 21A-C may be sufficiently translucent to permit the level of liquid or dry powder to be determined, container 1 may be equipped with a graduated dip stick 86, depicted in FIG. 2A, that mates with bunghole 13A, for determining the volume of liquid held within container 1.

Lid 10 is equipped with at least one ring-shaped expansion chamber 11 which is raised above the lid's surface 14. Each expansion chamber 11 is concentric with the circumference of lid 10 and surrounds fill opening 12. Further, each expansion chamber 11 is hollow and has a height of approximately one (1) inch. When vessel 20 is full, each expansion chamber 11 creates air pockets within container 1. If the contents of container 1 expand due to changes in ambient temperature or due to external pressure on vessel lateral wall 21A or 21B or on lid 10, the increased pressure compresses the air pockets instead of rupturing the container. The amount of expansion that container 1 can withstand is dependent upon the temperature or pressure increase, the number and size of expansion chambers 11, and the strength of vessel wall 21A and 21B, bottom 24, and the connection between lid 10 and vessel 20.

Referring to FIGS. 11A-C, and 12A-B, lid 10 has an interior circumferential wall section 17A and an exterior circumferential wall section 17B that depend from lid surface 14. Wall sections 17A and 17B define an annulus 19. Within annulus 19, exterior wall section 17B is formed with circumferential female threads 18. Threads 18 correspond to and mate with circumferential male threads 28 on the exterior surface of the upper vessel wall 21A. The width of annulus 19 is equal to the width of upper vessel wall 21A, thus improving the seal between lid 10 and vessel 20 as depicted in FIG. 11C. Interior Wall section 17A also serves to protect threads 18 when lids 10 are stacked for shipment as shown schematically in FIG. 10.

Referring again to FIGS. 11A and 11B of the drawings, container 1 can be secured to pallet member 40 by means of fastening wires 82. Lid 10 can be formed with a plurality of fastening lugs 81 spaced about the circumference of lid 10 and projecting from the exterior of wall section 17B. To secure container 1 to pallet member 40, one end of fastening wire 82 is looped through fastening lug 81 and is secured to itself by means of a binding band 83. The other end of fastening wire 82 is secured to a tie-down point (not shown) on pallet member 40.

Preferably, lid 10 is molded with a lid lip 15, depicted in FIGS. 2 and 12A-B, projecting from the exterior of wall section 17B and surrounding lid 10. During the RIM molding of lid 10, female threads 18 tend to shrink into the lid mold. The presence of lid lip 15 reduces this shrinkage, thus simplifying the removal of lid 10 from the lid mold. A plurality of lid lugs 16 are spaced about the circumference of lid lip 15, as shown in FIGS. 2 and 12A-B. These lid lugs 16 make it easy to hold lid 10 against rotating as the threaded portion of the lid mold is spun out of lid 10.

Figure 17:
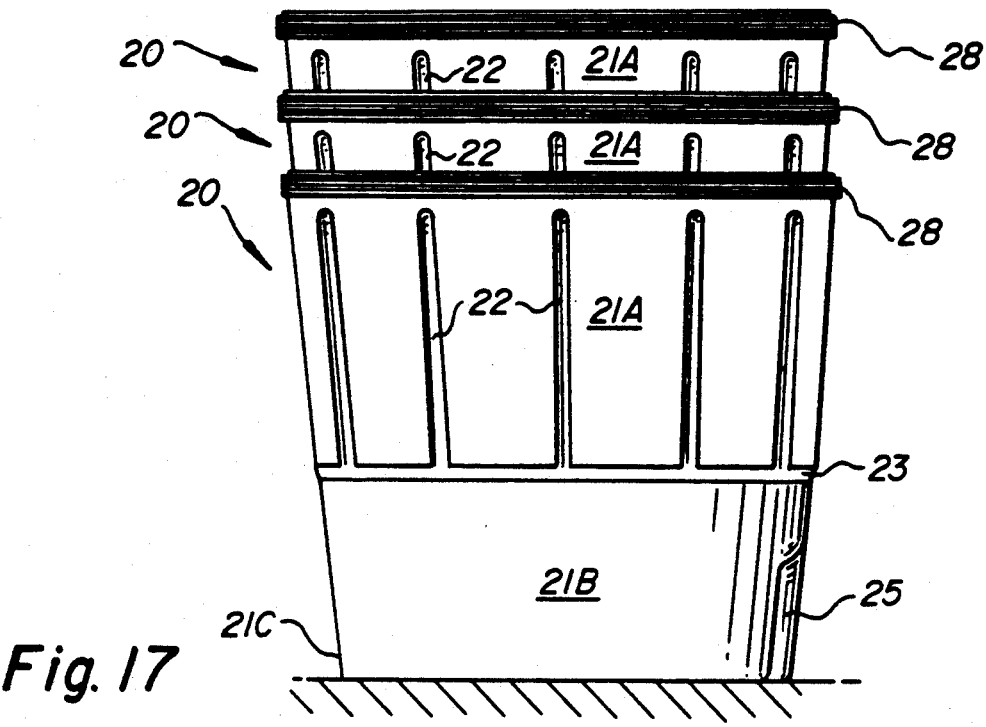
FIG. 17 is a reduced-size view of three of the vessels depicted in FIG. 1, nested inside one another.

As shown as FIGS. 1 and 3, vessel 20 is inclined inwardly from top to bottom so as to define an upper truncated conical section 20A and a lower truncated conical section 20B. Upper truncated conical section 20A is defined by lateral wall 21A, and lower truncated conical section 20B is defined by lateral wall 21B. The angle of inclination of lateral walls 21A and 21B is approximately five (5) degrees. Although not apparent from the drawings, the thickness of lateral walls 21A and 21B is greater at the bottom than at the top. Thus, the thickness of lateral wall 21A steadily increases (from top to bottom) from about 0.145 inch to about 0.180 inch, while the thickness of lateral wall 21B increases from about 0.180 inch to about 0.210 inch. The junction of these two conical sections is a horizontal shoulder 23, shown in detail in FIG. 6. Lateral walls 21A and 21B are strengthened with a plurality of reinforcing ribs 22. Ribs 22 are concave or flush on the exterior wall surfaces and convex on the interior wall surfaces. As shown in FIGS. 1, 3, and 17, ribs 22 are concave on the exterior surface of lateral wall 21A and flush on the exterior surface of lateral wall 21B.

Figure 5:
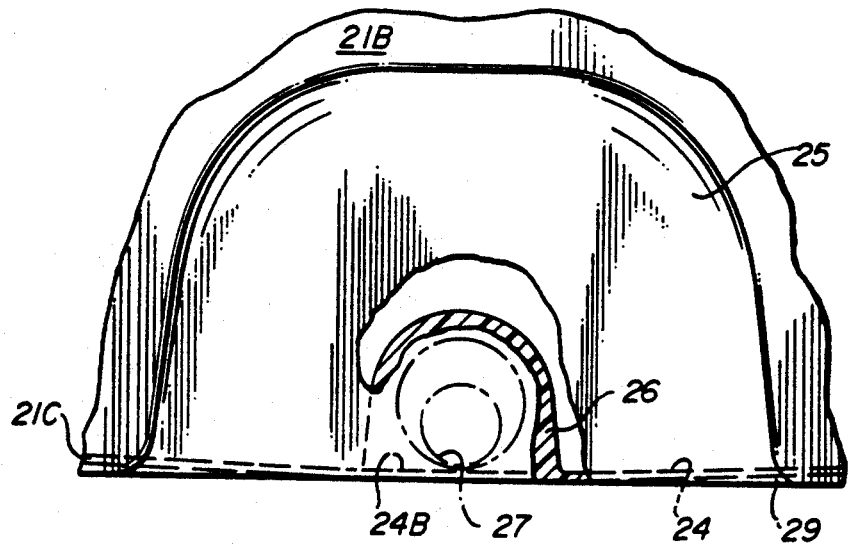
FIG. 5 is an enlarged front view (partially broken-away) of the region of the vessel of FIG. 4 at which the recess in the wall is located.

Lower truncated conical section 20B has a recess 25 at the base of its lateral wall 21B. Recess 25 encloses and protects a female-threaded discharge hole 27 and a male-threaded drain valve 30. Drainage hole 27 is located at substantially the same level as the lowest point inside vessel 20, as shown in FIG. 5. Recess wall 26 surrounding drainage hole 27 is one and one-half (1.5) inches thick or approximately six (6) times the thickness of lateral wall 21A and 21B elsewhere in vessel 20.

Figure 4:
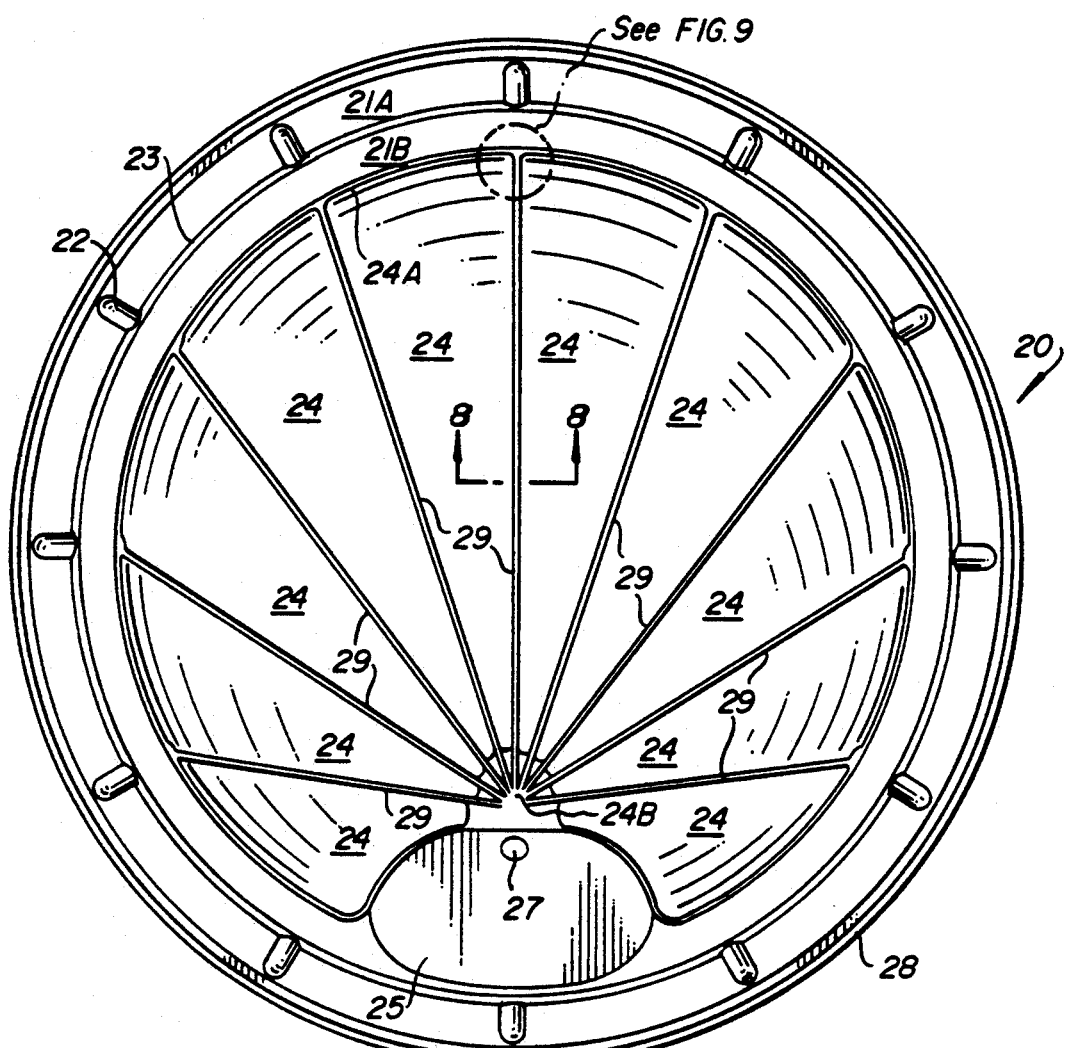
FIG. 4 is a bottom view of the vessel portion of the container shown in FIG. 1.

Bottom 24 joins to lateral wall 21B at junction 24A and slopes downward toward a sump 24B in bottom 24, immediately opposite drainage hole 27. As shown in FIGS. 7 and 8, triangular reinforcing fins 29 extend from bottom 2 and are substantially flush with the lowermost lateral wall section 21C that extends below bottom 24. These fins 29 extend radially from recess 25 and sump 24B as depicted in FIGS. 2 and 4. Moreover, each reinforcing fin 29 joins a reinforcing rib 22 at the junction of wall 21B with bottom 24. This junction is shown in detail in FIG. 9. Fins 29 permit vessel 20 to stand upright on pallet member 40 despite its sloped bottom 24. They also permit vessels 20 to be stacked and nested, as depicted in FIG. 17, for convenient storage and transportation. When vessels 20 are nested, the top edge of lateral wall 21A of each nested vessel 20 is approximately five (5) inches above the top edge of lateral wall 21A of the next lower vessel 20.

Container 1 may be mounted on pallet member 40 or it may be nested in a tub 50, as shown in FIGS. 13, 14A-B and 18. If container 1 is mounted on pallet member 40, it preferably will be secured to pallet member 40 by means of restraining straps (not shown) or by means of fastening lugs 81 and fastening wires 82 described above. Further, container 1 preferably will be positioned on the pallet member's top surface 41 by a plurality of positioning blocks 44 which abut vessel 20 at its base around its circumference, and which are fastened to the pallet member, as shown in FIG. 3. Pallet member 40 is constructed with a valve access cut-out 46 immediately before recess 25 and drain valve 30. Cut-out 46 permits easy access to drain valve 30 when draining container 1. Moreover, cut-out 46 prevents drain valve 30 from resting on top surface 41 if the weight of the contents of container 1 causes vessel 20 to distort and drain valve 30 to sag.

Figure 13:
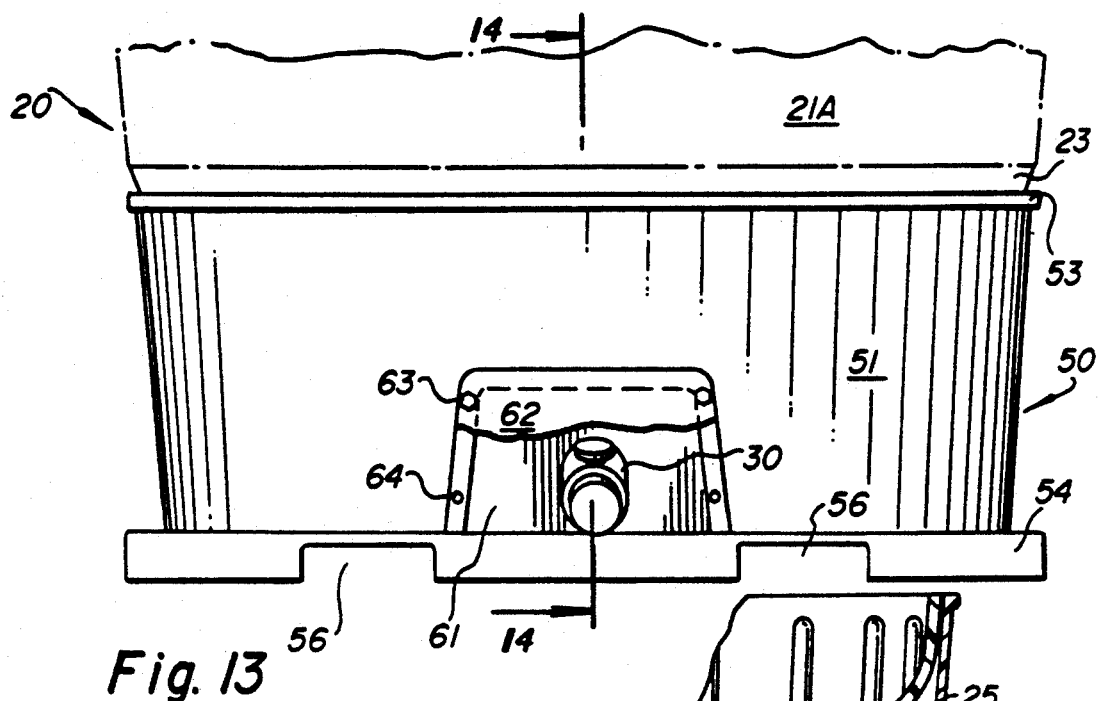
FIG. 13 is a front view of a tub for use with the container shown in FIG. 1.
Figure 14A:
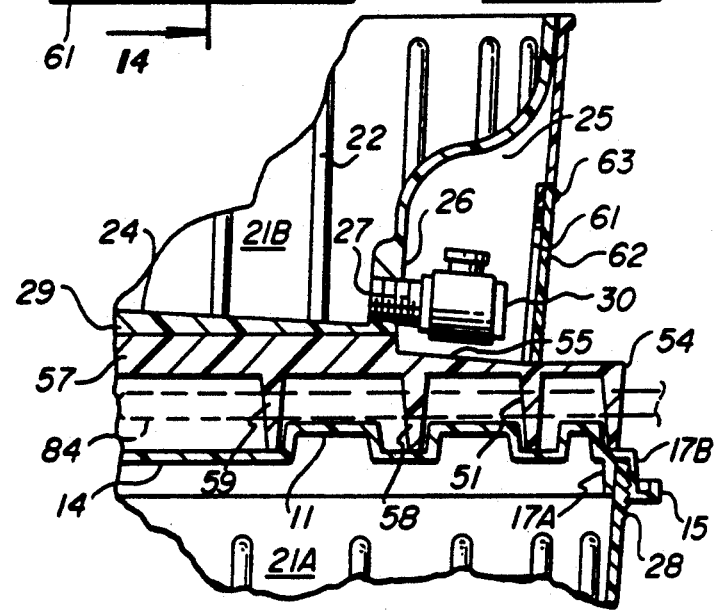
FIG. 14A is a semi-schematic, cross sectional representation of the portion of the container including the drain valve, taken along the line 14—14 in FIG. 13, nesting on the lid of another similar container.
Figure 14B:
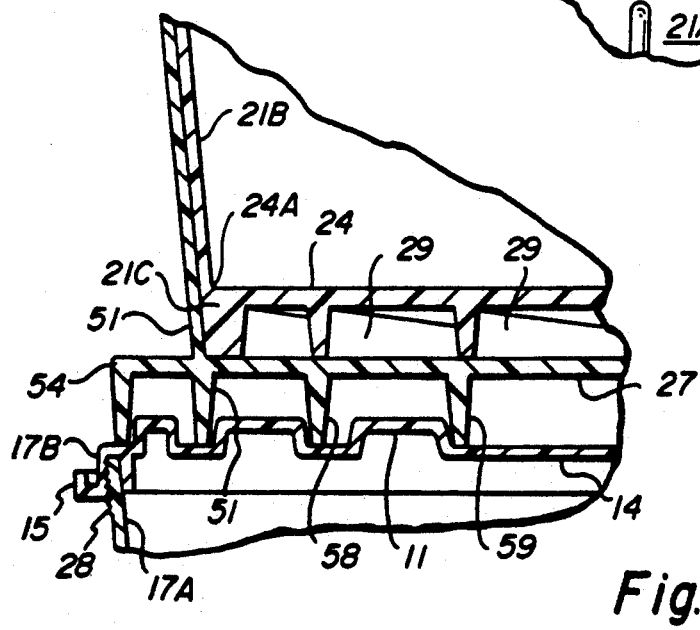
FIG. 14B is a semi-schematic, cross-sectional representation of the portion of the container opposite the drain valve, taken along the line 14—14 in FIG. 13, nesting on the lid of another similar container.

Referring to FIGS. 13 and 14A-B of the drawings, tub 50 is comprised of a lateral wall 51 and a bottom 57. Although not apparent from the drawings, the thickness of lateral wall 51 steadily increases (from top to bottom) from about 0.250 inch to about 0.280 inch. Lateral wall 51 extends below bottom 57, such that bottom 57 is approximately six (6) inches above the bottom edge of lateral wall 51. The height of lateral wall 51 above bottom 57 is between approximately one-third and one-half the height of vessel 20 and corresponds to the height of lateral walls 21B and 21C. Tub 50 is formed with a rim 53 that corresponds to horizontal shoulder 23 and with vertical ribs 52 that are flush on the exterior surface and convex on the interior surface of lateral wall 51 and correspond to vertical ribs 22 on vessel 20.

As shown in FIGS. 13 and 14A-B, tub 50 is equipped with a sump 55 and a valve access opening 61 to permit easy access to valve 30. Valve access opening 61 is equipped with a valve access cover 62 which protects valve 30 from damage during transportation. Valve access cover 62 is secured to tub 50 by four quarter-turn fasteners 63 that are fixed in valve access cover 62. Four holes are drilled into tub 50 around the edge of valve access opening 61. Each of these holes is equipped with a sheet metal retainer 64. Fasteners 63 are positioned on access cover 62, such that they correspond to retainers 64. Fasteners 63 snap into retainers 64 and secure access cover 62 to tub 50.

Figure 18:
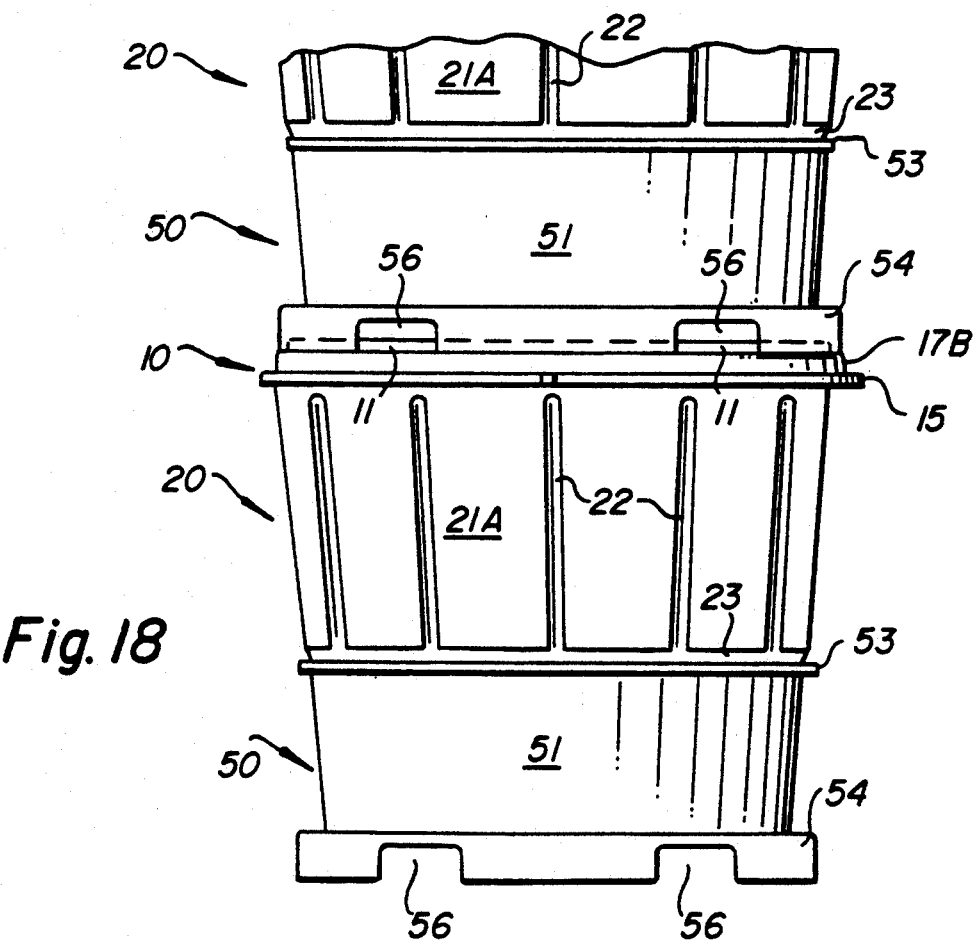
FIG. 18 shows schematically, in reduced size, a rear view of two of the containers of FIG. 1 sitting in the tubs of FIGS. 13 and 16 and stacked one on top of the other.

Tub 50 is also equipped with a plurality of forklift entry pockets 56 which permit two-way entry of a forklift's tines 84, as shown in FIG. 15, or four-way entry of a forklift's tines 84, as shown in FIG. 16. Entry pockets 56 provide an entry clearance of between three (3) and three and one-half (3.5) inches above a flat surface and between two (2) and two and one-half (2.5) inches between stacked containers. The underside of tub 50 is configured so that lateral wall 51, inner supporting ring segments 58, and center supporting ring 59 nest between expansion chamber rings 11 but do not interfere with the insertion of forklift's tines 84 into forklift entry pockets 56. As shown in FIG. 15, lateral wall 51, inner supporting ring segments 58, and center supporting ring 59 are reinforced by radial supporting ribs 75. When two or more containers 1 equipped with the tubs 50 are stacked, lateral wall 51, inner supporting ring segments 58, and center supporting ring 59 of upper tub 50 are supported by lid surface 14 of lower container 1, as shown in FIG. 14A–B. In order to prevent the weight of an upper container 1 from causing the lid 10 of a lower container 1 to sag, tub 50 is molded with a strengthening lip 54 projecting from lateral wall 51 at approximately the level of bottom 57. Strengthening lip 54 is curved so as to contact lid 10 of a lower container 1 at a point immediately above the lower container's lateral wall 21A. This positioning transmits some of the weight of a stacked container directly to lateral wall 21A–C of a lower container, as shown in FIG. 18.

Also contemplated is an embodiment of the invention in which bottom 24 and lateral wall 21C are modified by the addition of forklift pockets 56, inner supporting ring segments 58, and center supporting ring 59, as shown in FIG. 15 or 16, to create an integral pallet (not shown).

The plastic used to make lid 10, vessel 20, and tub 50 may, for example, have a flexural modulus of about 215,000 p.s.i. (ASTM Method D 790), a tensile modulus of about 270,000 p.s.i. (ASTM Method D 638), a Rockwell hardness of about R-115 (ASTM Method D 785), and an Izod impact strength (notched, at 23° C.) of about 8 ft. lbs/inch (ASTM Method D 256).

Container 1 is suitable for the transportation and storage of liquids or dry powders. When mounted on pallet member 40 or in tub 50, or when modified to include an integral pallet (not shown), the container may be stacked when full and moved by forklift. Because of its easy disassembly, it can be used, cleaned, refilled, and re-used.

We claim:

1. A transportable, self-supporting container for bulk liquids or particulate solids, comprising:

a rigid, round, plastic vessel molded in one piece, said vessel having a bottom, lateral wall, and an open top, said lateral wall being inclined inwardly from top to bottom so as to define an upper truncated conical section and a lower, set-back, truncated conical section coaxial with said upper section, both said conical sections being sections of right circular cones, said wall having an inner surface and an outer surface and a recess therein adjacent said bottom, the inside surface of said bottom sloping downward toward the recess, said wall of the vessel having a thickness at least about 5 times thicker at said recess than elsewhere, and said wall having a plurality of vertical ribs therein;

a round lid having an upperside and an underside and a threaded fill opening therein;

securing means located on said wall and corresponding securing means located on said lid, such that said securing means on said lateral wall mate with said corresponding securing means on said lid to hold said lid to said vessel;

and a threaded cap that mates with said threads in said fill opening.

2. The container of claim 1 wherein said securing means located on said wall and said corresponding securing mean located on said lid are circumferential threads.

3. The container of claim 2 wherein said threads on said lid are in a narrow annulus defined by parallel, inner and outer circumferential wall sections projecting downward from said underside of said lid and having a width approximately the same as the width of said wall at its top.

4. The container of claim 3 wherein said threads on the top of said wall are male threads.

5. The container of claim 4 wherein said vessel has a capacity in a range of about 30 to 1000 gallons.

6. The container of claim 4 wherein said vessel has a capacity in a range of about 55 to 500 gallons.

7. The container of claim 6 wherein said recess of said wall has a female-threaded, horizontal discharge hole therethrough, suitable for receiving a male-threaded dispensing device.

8. The container of claim 7 wherein said plastic has a flexural modulus in a range of about 250,000 to 1,500,000 p.s.i. (ASTM Method D 790), a tensile modulus in a range of about 200,000 to 1,000,000 p.s.i (ASTM Method D 638), a Rockwell hardness in the range of R-100 to R-130 (ASTM Method D 785), and an Izod impact strength (notched, at 23° C.) in a range of about 6 to 17 ft. lbs./inch (ASTM Method D 256).

9. The container of claim 8 wherein said vertical ribs in said wall of said vessel are convex on the inner surface of the wall and non-convex on said outer surface of said wall.

10. The container of claim 9 wherein said vertical ribs are concave on said outer surface of said wall on said upper conical section and flush on said lower conical section.

11. The container of claim 7 wherein said wall has an angle of inclination within a range of about 2 to 10 degrees.

12. The container of claim 8 wherein said wall has an angle of inclination within a range of about 2 to 10 degrees.

13. The container of claim 10 wherein said wall has an angle of inclination within a range of about 2 to 10 degrees.

14. The container of claim 12 wherein said underside of said bottom of said vessel has a plurality of downwardly projecting, triangular reinforcing fins, each fin having a top edge and a bottom edge, such that said fins extend radially from said recess in said lateral wall and are substantially flush on their bottom edges with said lateral wall's bottom edge.

15. The container of claim 12 wherein the width of said wall at said recess is within a range of about 1 to 2 inches and said width of the wall elsewhere is within a range of about 0.145 to 0.280 inch.

16. The container of claim 15 wherein said lid has at least one expansion chamber therein that will trap a pocket of air when said container is filled with a liquid to said fill opening's top.

17. The container of claim 15 wherein said lid has a plurality of reinforcing ribs that extend radially from said lid's center.

18. The container of claim 15 wherein said cap has a bunghole therein and a bung to plug said bunghole.

19. The container of claim 16 wherein said expansion chamber in said lid is shaped as an upwardly bulging ring that is concentric with said lid's circumference.

20. The container of claim 7 wherein said plastic is selected from a group consisting of poly(dicyclopentadiene), polyurethane, and polyurea.

21. The container of claim 8 wherein said plastic is poly(dicyclopentadiene).

22. The container of claim 12 wherein said plastic is poly(dicyclopentadiene).

23. The container of claim 15 wherein said plastic is poly(dicyclopentadiene) and said vessel has a capacity in a range of about 200 to 500 gallons.

24. The container of claim 19 wherein said plastic is poly(dicyclopentadiene).

25. The container of claim 12 wherein the ratio of the height of said vessel to the diameter of said vessel at its bottom is within a range of about 1:1 to 1.5:1.

26. The container of claim 15 wherein the ratio of the height of the vessel to the diameter of said vessel at its bottom is within the range of about 1:1 to 1.5:1.

27. The container of claim 23 wherein the ratio of the height of said vessel to the diameter of the vessel at its bottom is within the range of about 1:1 to 1.5:1.

28. The container of claim 7 wherein said vessel's wall has a lower section which extends below said vessel's bottom, and said lower section includes forklift pockets, permitting at least two-way entry by a forklift's tines.

29. The container of claim 8 wherein said vessel's wall has a lower section which extends below said vessel's bottom, and said lower section includes forklift pockets, permitting at least two-way entry by a forklift's tines.

30. The container of claim 12 wherein said vessel's wall has a lower section which extends below said vessel's bottom, and said lower section includes forklift pockets, permitting at least two-way entry by a forklift's tines.

31. The container of claim 15 wherein said vessel's wall has a lower section which extends below said vessel's bottom, and said lower section includes forklift pockets, permitting at least two-way entry by a forklift's tines.

32. The container of claim 23 wherein said vessel's wall has a lower section which extends below said vessel's bottom, and said lower section includes forklift pockets, permitting at least two-way entry by a forklift's tines.

33. The container of claim 28 wherein said forklift pockets in said wall's lower section permit four-way entry by a forklift's tines.

34. The container of claim 29 wherein said forklift pockets in said wall's lower section permit four-way entry by a forklift's tines.

35. The container of claim 30 wherein said forklift pockets in said wall's lower section permit four-way entry by a forklift's tines.

36. The container of claim 31 wherein said forklift pockets in said wall's lower section permit four-way entry by a forklift's tines.

37. The container of claim 32 wherein said forklift pockets in said wall's lower section permit four-way entry by a forklift's tines.

38. The container of claim 31 wherein said lid has an upwardly bulging ring that is concentric with said lid's circumference, and there is a complementary indentation in said bottom's outside surface, such that when one such container is stacked upon another, said ring of the lower container's lid nests in said indentation of the upper container's bottom, stabilizing the latter against lateral movement with reference to the lower container.

39. The container of claim 36 wherein said expansion chamber is shaped as an upwardly bulging ring that is concentric with said lid's circumference, and there is a complementary indentation in said bottom's outside surface, such that when one such container is stacked upon another, said chamber of the lower container's lid nests in said indentation of the upper container's bottom, stabilizing the latter against lateral movement with reference to the lower container.

40. The container of claim 2 additionally comprising a rigid, round, plastic tub molded in one piece, said tub having a bottom, a lateral wall, and an open top, and being of a shape and size that permit said vessel to sit snugly inside said tub, said lateral wall of said tub extending below said tub's bottom and including forklift pockets permitting at least two-way entry, and the height of said tub's wall above its bottom being about 33 to 50 percent of the height of said vessel's wall above its bottom such that the top of said tub's lateral wall abuts a horizontal shoulder in said vessel's wall formed by said upper truncated conical section's junction with said lower truncated conical section.

41. The container of claim 7 additionally comprising a rigid, round, plastic tub molded in one piece, said tub having a bottom, a lateral wall, and an open top, and being of a shape and size that permit said vessel to sit snugly inside said tub, said wall of said tub extending below said tub's bottom and including forklift pockets permitting at least two-way entry, and the height of said tub's wall above its bottom being about 33 to 50 percent of the height of said vessel's wall above its bottom such that the top of said tub's lateral wall abuts a horizontal shoulder in said vessel's wall formed by said upper truncated conical section's junction with said lower truncated conical section.

42. The container of claim 8 additionally comprising a rigid, round, plastic tub molded in one piece, said tub having a bottom, a lateral wall, and an open top, and being of a shape and size that permit said vessel to sit snugly inside said tub, said wall of said tub extending below said tub's bottom and including forklift pockets permitting at least two-way entry, and the height of the tub's wall above its bottom being about 33 to 50 percent of the height of said vessel's wall above its bottom such that the top of said tub's lateral wall abuts a horizontal shoulder in said vessel's wall formed by said upper truncated conical section's junction with said lower truncated conical section.

43. The container of claim 12 additionally comprising a rigid, round, plastic tub molded in one piece, said tub having a bottom, a lateral wall, and an open top, and being of a shape and size that permit said vessel to sit snugly inside said tub, said wall of said tub extending below said tub's bottom and including forklift pockets permitting at least two-way entry, and the height of said tub's wall above its bottom being about 33 to 50 percent of the height of said vessel's wall above its bottom such that the top of said tub's lateral wall abuts a horizontal shoulder in said vessel's wall formed by said upper truncated conical section's junction with said lower truncated conical section.

44. The container of claim 15 additionally comprising a rigid, round, plastic tub molded in one piece, said tub having a bottom, a lateral wall, and an open top, and being of a shape and size that permit said vessel to sit snugly inside said tub, said wall of said tub extending below said tub's bottom and including forklift pockets permitting at least two-way entry, and the height of said tub's wall above its bottom being about 33 to 50 percent of the height of said vessel's wall above its bottom such that the top of said tub's lateral wall abuts a horizontal shoulder in said vessel's wall formed by said upper truncated conical section's junction with said lower truncated conical section.

45. The container of claim 23 additionally comprising a rigid, round, plastic tub molded in one piece, said tub having a bottom, a lateral wall, and an open top, and being of a shape and size that permit said vessel to sit snugly inside said tub, said wall of said tub extending below said tub's bottom and including forklift pockets permitting at least two-way entry, and the height of said tub's wall above its bottom being about 33 to 50 percent of the height of said vessel's wall above its bottom such that the top of said tub's lateral wall abuts a horizontal shoulder in said vessel's wall formed by said upper truncated conical section's junction with said lower truncated conical section.

46. The container of claim 40 wherein said expansion chamber is shaped as an upwardly bulging ring that is concentric with said lid's circumference, and there is a complementary indentation in said bottom's outside surface, such that when one such container is stacked upon another, said ring of the lower container's lid nests in said indentation of the upper container's bottom, stabilizing the latter against lateral movement with reference to the lower container.

47. The container of claim 41 wherein said expansion chamber is shaped as an upwardly bulging ring that is concentric with said lid's circumference, and there is a complementary indentation in said bottom's outside surface, such that when one such container is stacked upon another, said ring of the lower container's lid nests in said indentation of the upper container's bottom, stabilizing the latter against lateral movement with reference to the lower container.

48. The container of claim 42 wherein said expansion chamber is shaped as an upwardly bulging ring that is concentric with said lid's circumference, and there is a complementary indentation in said bottom's outside surface, such that when one such container is stacked upon another, said ring of the lower container's lid nests in said indentation of the upper container's bottom, stabilizing the latter against lateral movement with reference to the lower container.

49. The container of claim 44 wherein said expansion chamber is shaped as an upwardly bulging ring that is concentric with said lid's circumference, and there is a complementary indentation in said bottom's outside surface, such that when one such container is stacked upon another, said ring of the lower container's lid nests in said indentation of the upper container's bottom, stabilizing the latter against lateral movement with reference to the lower container.

50. The container of claim 40 wherein said forklift pockets in said tub's wall permit four-way entry by a forklift's tines.

51. The container of claim 46 wherein said forklift pockets in said tub's wall permit four-way entry by a forklift's tines.

52. The container of claim 49 wherein said forklift pockets in said tub's wall permit four-way entry by a forklift's tines.

53. The container of claim 15 wherein said lid has a plurality of turning lugs on its circumference.

54. The container of claim 23 wherein said lid has a plurality of turning lugs on its circumference.

55. The container of claim 31 wherein said lid has a plurality of turning lugs on its circumference.

56. The container of claim 36 wherein said lid has a plurality of turning lugs on its circumference.

57. The container of claim 44 wherein said lid has a plurality of turning lugs on its circumference.

58. The container of claim 2 wherein said lid has an upturned lip around its outer circumferential wall section.

59. The container of claim 7 wherein said lid has an upturned lip around its outer circumferential wall section.

60. The container of claim 12 wherein said lid has an upturned lip around its outer circumferential wall section.

61. The container of claim 23 wherein said lid has an upturned lip around its outer circumferential wall section.

62. The container of claim 31 wherein said lid has an upturned lip around its outer circumferential wall section.

63. The container of claim 36 wherein said lid has an upturned lip around its outer circumferential wall section.

64. The container of claim 44 wherein said lid has an upturned lip around its outer circumferential wall section.

65. The container of claim 53 wherein said lid has an upturned lip around its outer circumferential wall section.

66. A transportable, self-supporting container for bulk liquids or particulate solids, comprising:
a rigid, round vessel molded in one piece of poly(dicyclopentadiene) plastic, said vessel having a bottom, a lateral wall, and an open top, said lateral wall being male-threaded at the top and inclined inwardly from top to bottom by about 2 to 10 degrees so as to define an upper truncated conical section and a lower, set-back, truncated conical section coaxial with said upper section, both said conical sections being sections of right circular cones, said wall having an inner surface and an outer surface and a recess therein adjacent said bottom, said bottom of said vessel having an inside surface and an outside surface, said inside surface being sloped downward toward said recess, said vessel's wall at the recess having a width in a range of about 1 to 2 inches and said width of said wall elsewhere being within a range of about 0.145 to 0.280 inch, said vessel having a capacity in a range of about 55 to 500 gallons, said wall of said vessel having a plurality of vertical ribs therein that are convex on the inner surface of the wall and concave on said outer surface of said upper section's wall and flush on said outer surface of said lower section's wall, the ratio of the height of said vessel to the diameter of said vessel at its bottom being within a range of about 1:1 to 1.5:1, said recess having a female-threaded, horizontal, discharge hole therethrough, suitable for receiving a male-threaded dispensing device, said discharge hole having a lowest point which is at substantially the same level as the lowest point inside said vessel;

a round lid having an upperside and an underside and circumferential female threads thereon that mate with said threads on the top of said wall, said female threads being in a narrow annulus defined by parallel, inner and outer circumferential wall sections protruding downward from the underside of the lid and having a width approximately the same as the width of said vessel's wall at its top, said lid having a centrally located threaded fill opening therein and at least one expansion chamber shaped as an upwardly bulging ring that is concentric with said lid's circumference, said expansion chamber ring being operable to trap a pocket of air when said container is filled to the top of said fill opening, an upturned lip around its outer circumferential wall section, said lid having a plurality of turning lugs on its upturned lip, and a plurality of reinforcing ribs that extend radially from said lid's center;

and a threaded cap that mates with said threads in said fill opening, said cap having a female-threaded bunghole therein and a male-threaded bung to plug said bunghole.

67. The container of claim 66 wherein said plastic has a flexural modulus in the range of about 250,000 to 1,500,000 p.s.i. (ASTM Method D 790), a tensile modulus in the range of about 200,000 to 1,000,000 p.s.i (ASTM Method D 638), a Rockwell hardness in the range of R-100 to R-130 (ASTM Method D 785), and an Izod impact strength (notched, at 23° C.) of about 6 to 17 ft. lbs./inch (ASTM Method D 256).

68. The container of claim 67 wherein said underside of said bottom of said vessel has a plurality of downwardly projecting, triangular reinforcing fins, each fin having a top edge and a bottom edge, such that said fins extend radially from said recess in said lateral wall and are substantially flush on their bottom edges with said lateral wall's bottom edge.

69. The container of claim 67 wherein said vessel's lateral wall has a lower section which extends below said vessel's bottom, and said lower section includes forklift pockets, permitting at least two-way entry by a forklift's tines.

70. The container of claim 69 wherein said forklift pockets in said wall's lower section permit four-way entry by a forklift's tines.

71. The container of claim 69 wherein, in said bottom's outside surface, there is an indentation that is complementary to said expansion chamber ring in said lid, such that when one such container is stacked upon another, said ring of said lower container's lid nests in the indentation of said upper container's bottom, stabilizing the latter against lateral movement with reference to said lower container.

72. The container of claim 71 wherein said forklift pockets in said wall's lower section permit four-way entry by a forklift's tines.

73. The container of claim 67, wherein said vessel has a capacity in a range of about 200 to 500 gallons, additionally comprising a rigid, round, plastic tub molded in one piece, said tub having a bottom, a lateral wall, and an open top, and being of a shape and size that permit said vessel to sit snugly inside said tub, said lateral wall of said tub extending below said tub's bottom and including forklift pockets permitting at least two-way entry, and the height of said tub's wall above its bottom being about 33 to 50 percent of the height of said vessel's lateral wall, such that when said vessel sits inside said tub the top of said tub's lateral wall abuts a horizontal shoulder in said vessel's wall formed by said upper truncated conical section's junction with said lower truncated conical section.

74. The container of claim 73 wherein said forklift pockets in said tub's wall permit four-way entry by a forklift's tines.

75. The container of claim 73 wherein said tub is molded with a strengthening lip surrounding said tub and extending from said tub at the height of said tub's bottom and curving downward such that when said containers are stacked one on top of another said lip of said upper container's tub contacts said lid of said lower container directly above said lower container's vessel's wall and distributes said upper container's weight to said lower container's vessel's wall, wherein said tub has forklift pockets permitting at least two-way entry.

76. The container of claim 40 wherein said tub is molded with a strengthening lip surrounding said tub and extending from said tub at the height of said tub's bottom and curving downward such that when said containers are stacked one on top of another said lip of said upper container's tub contacts said lid of said lower container directly above said lower container's vessel's wall and distributes said upper container's weight to said lower container's vessel's wall, wherein said tub has forklift pockets permitting at least two-way entry.

77. The container of claim 41 wherein said tub is molded with a strengthening lip surrounding said tub and extending from said tub at the height of said tub's bottom and curving downward such that when said containers are stacked one on top of another said lip of said upper container's tub contacts said lid of said lower container directly above said lower container's vessel's wall and distributes said upper container's weight to said lower container's vessel's wall, wherein said tub has forklift pockets permitting at least two-way entry.

78. The container of claim 42 wherein said tub is molded with a strengthening lip surrounding said tub and extending from said tub at the height of said tub's bottom and curving downward such that when said containers are stacked one on top of another said lip of said upper container's tub contacts said lid of said lower container directly above said lower container's vessel's wall and distributes said upper container's weight to said lower container's vessel's wall, wherein said tub has forklift pockets permitting at least two-way entry.

79. The container of claim 43 wherein said tub is molded with a strengthening lip surrounding said tub and extending from said tub at the height of said tub's bottom and curving downward such that when said containers are stacked one on top of another said lip of said upper container's tub contacts said lid of said lower container directly above said lower container's vessel's wall and distributes said upper container's weight to said lower container's vessel's wall, wherein said tub has forklift pockets permitting at least two-way entry.

80. The container of claim 44 wherein said tub is molded with a strengthening lip surrounding said tub and extending from said tub at the height of said tub's bottom and curving downward such that when said containers are stacked one on top of another said lip of said upper container's tub contacts said lid of said lower container directly above said lower container's vessel's wall and distributes said upper container's weight to said lower container's vessel's wall, wherein said tub has forklift pockets permitting at least two-way entry.

81. The container of claim 45 wherein said tub is molded with a strengthening lip surrounding said tub and extending from said tub at the height of said tub's bottom and curving downward such that when said containers are stacked one on top of another said lip of said upper container's tub contacts said lid of said lower container directly above said lower container's vessel's wall and distributes said upper container's weight to said lower container's vessel's wall, wherein said tub has forklift pockets permitting at least two-way entry.

* * * * *

UNITED STATES PATENT AND TRADEMARK OFFICE
CERTIFICATE OF CORRECTION

PATENT NO. : 5,232,120
DATED : August 3, 1993
INVENTOR(S) : SIDNEY H. DUNKEN, ET AL.

Page 1 of 2

It is certified that error appears in the above-indentified patent and that said Letters Patent is hereby corrected as shown below:

COLUMN 1

Line 49, "stacking So" should read --stacking. So--

COLUMN 2

Line 2, "o" should read --of--.
Line 9, "vessel" should read --vessel.--.
Line 26, "to" should read --to the top of the vessel that correspond to those means on the--.
Line 48, "device" should read --device.--.

UNITED STATES PATENT AND TRADEMARK OFFICE
CERTIFICATE OF CORRECTION

PATENT NO.  : 5,232,120
DATED       : August 3, 1993
INVENTOR(S) : Sidney H. Dunken et al It is certified that error appears in the above-indentified patent and that said Letters Patent is hereby corrected as shown below:

Column 6, line 43, "With" should read --with--.
Column 6, line 47, "Can" should read --can --.

Signed and Sealed this

Twelfth Day of April, 1994

Attest:

BRUCE LEHMAN

Attesting Officer

*Commissioner of Patents and Trademarks*